United States Patent
Okada et al.

[11] Patent Number: 5,975,764
[45] Date of Patent: Nov. 2, 1999

[54] ROLLING CONTACT BEARING AND MOUNTING THEREFOR

[75] Inventors: Kenji Okada, Yokkaichi; Takashi Yasunishi, Kuwana; Tutomu Mizutani, Mie, all of Japan

[73] Assignee: NT Corporation, Osaka, Japan

[21] Appl. No.: 09/035,974

[22] Filed: Mar. 6, 1998

[30] Foreign Application Priority Data

Mar. 6, 1997 [JP] Japan .................................. 9-051253

[51] Int. Cl.$^6$ ...................................................... F16C 19/06
[52] U.S. Cl. ............................ 384/476; 384/536; 384/493
[58] Field of Search ..................................... 384/476, 536, 384/582, 493, 557

[56] References Cited

FOREIGN PATENT DOCUMENTS 7208462  8/1995  Japan .

OTHER PUBLICATIONS

Patent Abstracts of Japan (JPO) *Insulted Rolling Bearing* 07208462 A Aug. 11, 1995, 1 page.

*Primary Examiner*—Lenard A. Footland
*Attorney, Agent, or Firm*—Birch, Stewart, Kolasch & Birch, LLP.

[57] ABSTRACT

A rolling contact bearing includes an inner race (1), an outer race (2) accommodating therein the inner race (1), and a plurality of rolling elements (4) interposed between the inner and outer races (1, 2). An insulating covering (8) made of an elastic material having an electric insulating property is mounted around the outer race (2). This insulating covering (8) includes a cylindrical body (8a) and collars (8b) extending radially inwardly from opposite ends of the cylindrical body (8a). This cylindrical body (8a) in a natural condition has an inner diameter smaller than an outer diameter of the outer race (2), but in an assembled condition with the insulating covering (8) placed around the outer race (2) against its own elasticity, the cylindrical body (8a) is held in tight contact with an outer peripheral surface (2a) of the outer race (2) and the collars (8b) are held in tight contact with respective opposite end faces (2b) of the outer race (2).

9 Claims, 4 Drawing Sheets

ROLLING CONTACT BEARING AND MOUNTING THEREFOR

BACKGROUND OF THE INVENTION

1. Field of the Invention

The present invention relates to an antifriction bearing, particularly a rolling contact bearing such as, for example, that used with an inverter-controlled motor and a mounting adjacent to the motor, of a type used in an environment where electric corrosion is a primary problem. More specifically, the present invention relates to the rolling contact bearing of a type suited for use in an environment where problems associated with not only electric corrosion, but creepage of a bearing outer race tend to arise and which can advantageously used as a bearing for use on an free side of a shaft for permitting an axial displacement under the influence of a thermal expansion of the shaft.

2. Description of the Prior Art

Most electric motors currently largely utlized generally make use of a sealed, deep groove ball bearing. However, the use of invertor-controlled electric motor is a recent trend, and the increased use of the invertor-controlled electric motors has broght about a problem associated with electric corrosion occurring between rolling elements and one of the inner and outer races. The motors of the type referred to above are also susceptible to a problem associated with frictional wear occurring at an inner surface of a journal box, that encloses the bearing, as a result of a creepage in which an outer race of the bearing undergoes an circumferential displacement relative to the journal box receiving the outer race therein.

To minimize the electric corrosion, attempts have been made to use an insulating covering, made of resin or rubber, on and around the outer race of the bearing, and some of them have been put into practice.

On the other hand, the bearing hitherto suggested to minimize the problem associated with creepage is shown in FIG. 11, in which the outer peripheral surface of an outer race 51 is formed at two locations with axially spaced annular grooves for receiving therein corresponding O-rings 52. The bearing of the design shown in FIG. 11 is installed inside the journal box 54 with an oil 53 having been applied to a portion of the outer peripheral surface of the outer race 51 between the spaced O-rings 52. In the assembled condition, since the oil 53 is retained between the O-rings 52 and also between the outer peripheral surface of the outer race and the inner peripheral surface of the journal box 54, the creeping force can be reduced and, also, any possible creepage can be minimized by the effect of a frictional force brought about by the O-rings 52.

However, the insulating covering provided on the outer race of the prior art bearing is of a type that is integrally formed with the outer race by the use of an insert-molding technique. The use of the insert-molding technique renders the process of assembling the bearing to be complicated to such an extent that the production line has to be altered from that hitherto employed, resulting in increase of the cost of manufacture of the bearing.

Also, the creep-resistant bearing of the design shown in FIG. 11 has no function of resisting against the electric corrosion and, likewise, the bearing having the resin covering as described above has no function of resisting against creepage. Thus, although the bearing designed to minimize the problem associated with either the electric corrosion or the creepage is currently available in the market, no bearing has yet been developed which is effective to minimize both problems associated with the electric corrosion and the creepage. Moreover, the creep-resistant bearing shown in FIG. 11 has an additional problem in that complicated and time-consuming procedures are required to install the bearing on a machinery, and it often occurs that the worker fails to mount the O-rings 52 on the outer race of the bearing.

As a bearing effective to minimize both the electric corrosion and the creepage, the assignee of the present invention has suggested, in their Japanese Patent Application No. 6-23170, such a bearing as shown in FIG. 12. More specifically, the bearing shown in FIG. 12 includes an insulating covering 62 covering an outer peripheral surface and opposite end faces of the outer race 61, and two annular expansion compensating layers 63 of a generally ring-shaped configuration mounted on an outer peripheral surface of the insulating covering 62 in axially spaced relation to each other, each annular expansion compensating layer 63 being made of a resin having a coefficient of linear expansion greater than that of the insulating covering 62.

However, the structure employed in this suggested bearing to minimize the creepage is intended, where the journal box 64 is made of a material such as aluminum having a coefficient of linear expansion far greater than that of the bearing outer race 61, to avoid occurrence of creepage which would result from loosening of an engagement between the outer race 61 and the journal box 64 due to increase in temperature and, accordingly, the relatively great coefficient of linear expansion possessed by the expansion compensating layers 63 is utilized to avoid the creepage which would otherwise occur at an increased temperature. For this reason, such an anti-creep function as described above cannot be exhibited in the standard bearing device of a kind in which the unique relationship as to the coefficient of linear expansion cannot be obtained among the component parts of the bearing device.

Also, the expansion compensating layers 63 are so configured as to have a flat smooth outer peripheral surface to permit it to be held in tight contact with the journal box 64 to secure the anti-creep flnction assuredly and, accordingly, any axial displacement of the outer race 61 relative to the journal box can also be avoided. For this reason, the bearing of the structure shown in FIG. 12 is not suited as a bearing on a free side that permits an axial displacement of a shaft, that is inserted through a bore of the inner race, under the influence of a thermal expansion of the shaft, that is, as a bearing effective to accommodate an axial expansion of the shaft.

SUMMARY OF THE INVENTION

The present invention has been designed to substantially eliminate the above discussed problems inherent in the prior art rolling contact bearings and has for its object to provide an improved rolling contact bearing which has a relatively high resistance to electric corrosion and which can also be manufactured easily and inexpensively.

It is another object of the present invention to provide an improved rolling contact bearing of the kind referred to above, which is effective to resist against both electric corrosion and creepage and which can effectively be used as a bearing on a free side for permitting an axial relative displacement between the journal box and the shaft.

In order to accomplish these and other objects of the present invention, there is provided a rolling contact bearing including an inner race, an outer race accommodating therein the inner race, a plurality of rolling elements interposed between the inner and outer races, and an insulating covering made of an elastic material having an electric insulating property and mounted on the outer race. The insulating covering includes a generally cylindrical body and collars extending radially inwardly from opposite ends of the cylindrical body. This cylindrical body in a natural condition has an inner diameter smaller than an outer diameter of the outer race, but when the insulating covering is mounted on the outer race against its own elasticity, the cylindrical body is held in tight contact with an outer peripheral surface of the outer race and the collars are held in tight contact with respective opposite end faces of the outer race. The elastic material for the insulating covering may be, for example, a rubber or a synthetic resin.

According to the present invention, since the outer peripheral surface and the opposite end faces of the outer race are covered by the insulating layer, any possible electric corrosion between the rolling elements and the inner or outer race can be avoided which would otherwise result from a potential difference developed between the journal box and the shaft. Since the insulating covering is a member separate from, but is subsequently mounted around the outer race, the bearing from which the insulating covering is excluded can be manufactured by any existing production line and, therefore, the bearing of the present invention can be obtained merely by mounting the insulating covering around the outer race of the bearing so manufactured with no insulating covering. For this reason, the existing production line is required only minimum alteration or addition to enable the bearing of the present invention to be manufactured easily and inexpensively. Since the insulating covering is made of the elastic material and can be expanded against its own elasticity when mounting around the outer race, the insulating covering once tightly mounted on the outer race will not accidentally separate therefrom during transportation or storage of the bearing, or during mounting of the bearing in the journal box and can therefore be mounted snugly in the journal box.

Preferably, the outer race has its outer peripheral surface and opposite end faces formed with respective annular grooves and wherein the insulating covering is formed with an annular inner protrusion engaged in the annular groove in the outer peripheral surface of the outer race and also with an annular lateral protrusion engaged in the annular groove in any one of the opposite end faces of the outer race. Engagement of the annular protrusions in the corresponding annular grooves is effective to facilitate positioning of the insulating covering relative to the outer race during the mounting of the insulating covering around the outer race and, hence, to facilitate mounting of the insulating covering around the outer race with no possibility of the insulating covering accidentally separating from the outer race.

Also preferably, each of the collars of the insulating covering has an inner diameter smaller than an inner diameter of an inner edge portion of the outer race adjacent the corresponding end face when and so long as the insulating covering is mounted on the outer race.

Where the inner diameter of each collar of the insulating covering is equal to or greater than the inner diameter of the inner edge portion of the outer race adjacent the corresponding end face, electric sparks may be generated depending on the condition under which the bearing of the present invention is used. By way of example, if the journal box is of, for example, a design having a portion thereof confronting the adjacent end face of the outer race through the associated collar of the insulating covering and where a voltage applied between the journal box and the outer race is relatively high, there is the possibility that electric sparks may occur between the journal box and an inner edge portion of the inner surface of the outer race, which forms a portion of an outwardly exposed surface of the outer race closest to the journal box. Accordingly, selection of the smaller inner diameter of each collar of the insulating covering to thereby increase a spatial distance or a creeping distance between the outer race and the journal box is effective to eliminate the possibility of generation of the electric sparks.

In the rolling contact bearing of the design described above, the cylindrical body of the insulating covering may be formed at a plurality of location with a radial outer protrusion protruding radially outwardly therefrom, and an oil is applied in a space defined between the neighboring radial outer protrusions.

In such case, the rolling contact bearing of the present invention can have resistance against both electric corrosion and creepage. In other words, since the lubricant oil applied to that portion of the insulating covering is retained within a space delimited by the radially outer protrusions of the insulating covering, that outer peripheral surface portion of the insulating covering, and the inner peripheral surface of the journal box, a frictional force between the insulating covering and the journal box, which force would develop the creep force can be advantageously reduced to thereby avoid any possible creepage. Since in this way the rolling contact bearing of the present invention is of a design permitting the sealed oil to enhance an anti-creep effect, resistance to an axial displacement of the outer race relative to the journal box is minimal and, therefore, the rolling contact bearing of the present invention can advantageously be also used as a free-side bearing.

In addition, since the insulating covering is mounted on the outer race during the manufacture of the rolling contact bearing, mere application of the oil is sufficient at the time the bearing is to be installed in a machine and therefore, not only can the number of assembling procedures be reduced, but the possibility that the worker may fail to mount one or more component parts can also be avoided.

Moreover, the cylindrical body of the insulating covering may be formed with a radial inner protrusion protruding radially inwardly therefrom at a location aligned with each of the radial outer protrusions, and the radial inner protrusions may be engaged in the annular grooves in the outer peripheral surface of the outer race. The provision of the radial inner protrusions is effective to allow the insulating covering to be accurately positioned relative to the outer race to thereby enhance the assembly workability. Since the radial inner protrusions are so formed as to align with the respective radial outer protrusions in a radial direction so as to provide an increased thickness of the elastic material forming the insulating covering, the radial outer protrusions can deform considerably during insertion of the outer race to thereby facilitate installation of the bearing inside the journal box.

Each of the radial outer protrusions is preferably of a cross-sectional shape wherein a portion thereof at a point intermediate of the width thereof protrudes outwardly. This shape may be a generally semi-circular shape, a generally trapezoidal shape or a generally triangular shape. By so shaping, a portion of each radial outer protrusion that defines a fastening margin will be deformed to allow it to tilt in either lateral direction and, therefore, not only can mounting of the bearing in the journal box be facilitated, but also the resistance to an axial movement of the outer race can be minimized. Accordingly, the rolling contact bearing of the present invention can further advantageously be used as the free-side bearing.

The present invention also provides a mounting for installing the rolling contact bearing in a journal box, wherein an oil is applied in the space between the neighboring radial outer protrusions of the insulating covering and the outer race is press-fitted into an inner peripheral surface of the journal box.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
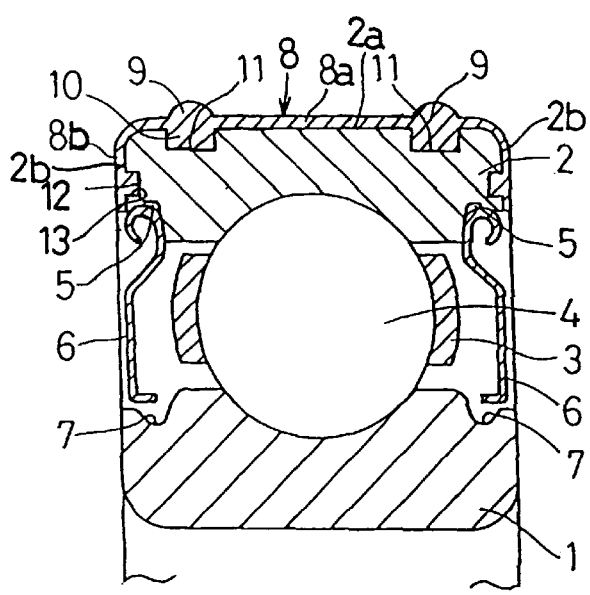
FIG. 1 is a fragmentary sectional view of a rolling contact bearing according to a first preferred embodiment of the present invention.
Figure 2:
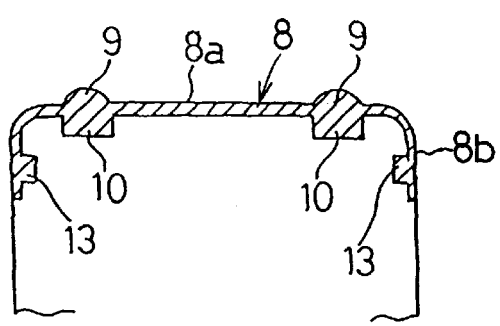
FIG. 2 is a fragmentary sectional view showing an insulating covering employed in the rolling contact bearing shown in FIG. 1.

Numerous preferred embodiments of the present invention will now be described with reference to FIGS. 1 to 10. According to a first preferred embodiment of the present invention shown in FIGS. 1 to 3, a rolling contact bearing shown therein is a seal-equipped, deep-groove ball bearing, including an inner race 1, an outer race 2 and a plurality of rolling elements, for example, balls 4, retained by a retainer 3. Opposite edge portions of the outer race 2 adjacent an inner peripheral surface thereof are inwardly recessed to define respective seal seats 5 in which associated annular seal members 6 are press-fitted. Each of the seal members 6 is in the form of a shield plate of a non-contact type and extends radially inwardly from the, corresponding seal seat towards the inner race 1 with its innermost edge positioned adjacent a respective seal groove 7, defined in an edge portion of the inner race 1 adjacent an outer peripheral surface of the inner race 1, so as to define a labyrinth seal. It is to be noted that each sealing member 6 may be in the form of a contact-type made of an elastic material such as, for example, rubber and equipped with a core.

The outer race 2 has an insulating covering 8 formed thereon so as to cover an outer peripheral surface 2a of the outer race 2 and opposite end faces 2b thereof in contact therewith. The insulating covering 8 is a member separate from the outer race 2 and is placed elastically tightly around the outer race 2. This insulating covering 8 is made of an electrically insulating elastic material such as synthetic rubber or resin and is shaped in the form of a hollow cylinder with a cylindrical body 8a having its opposite ends formed with a radially inwardly extending inner collar 8b. The cylindrical body 8a that is aligned with the outer peripheral surface 2a of the outer race 2 is formed at a plurality of, for example, two, locations adjacent the opposite ends thereof, integrally with annular protrusions 9 that extend circumferentially thereof and protruding radially outwardly therefrom. Respective portions of the outer peripheral surface 2a of the outer race 2 that are aligned with the radially outer protrusions 9 are formed with annular grooves 11. The insulating covering 8 has annular protrusions 10 formed integrally therewith so as to extend radially inwardly therefrom in alignment with, but in a direction counter to, the respective radially outer protrusions 9. The radially inner protrusions 10 integral with the insulating covering 8 are received within the respective annular grooves 11 in the outer race 2. As a matter of course, the radially outer and inner protrusions 9 and 10 are integral with the insulating covering 8.

In addition to the annular grooves 11, the outer race 2 has annular grooves 12 defined in the opposite end faces 2b thereof, respectively. On the other hand, respective inner collars 8b of the insulating covering 8 that cover the respective opposite end faces 2b of the outer race 2 are integrally formed with annular lateral protrusions 13 protruding therefrom so as to confront each other and received in the respective annular lateral grooves 12. Each of the annular grooves 11 and 12 may be of a rectangular cross-sectional shape or of a generally dovetail cross-sectional shape in which the bottom has a width somewhat larger than that of the opening.

The cylindrical body 8a of the insulating covering 8 in a natural condition has an inner diameter smaller than the outer diameter of the outer race 2 and is tightly mounted on the outer peripheral surface 2a of the outer race 2 against its own elasticity with the collars 8b held elastically in contact with the corresponding end faces of the outer race 2.

The extent to which the insulating covering 8 is kept elastically expanded radially outwardly when mounted on the outer race 2 is preferably within the range of 5 to 25% relative to the diameter of the insulating covering 8 in the natural condition. In other words, the inner diameter of the insulating covering 8 in a radially outwardly expanded condition, that is, when elastically expanded radially outwardly upon mounting on the outer race 2 attains a value preferably within the range of 105 to 125% of that in the natural condition. If the elastic expansion is smaller than 5%, a sufficient tightening force with which the insulating covering 8 is tightly mounted on the outer race 2 cannot be obtained. On the other hand, if the elastic expansion exceeds the upper limit of 25%, difficulty would be encountered in mounting the insulating covering 8 on and around the outer race 2 and/or the insulating covering 8 may be torn out beyond the maximum elongation.

Figure 4:
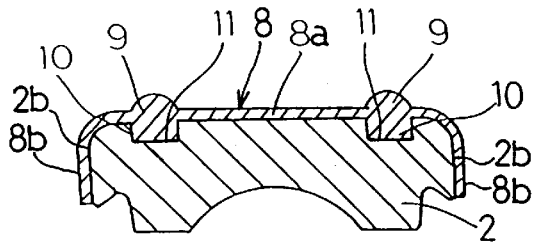
FIG. 4 is a fragmentary sectional view of a rolling contact bearing according to a second preferred embodiment of the present invention.
Figure 5:
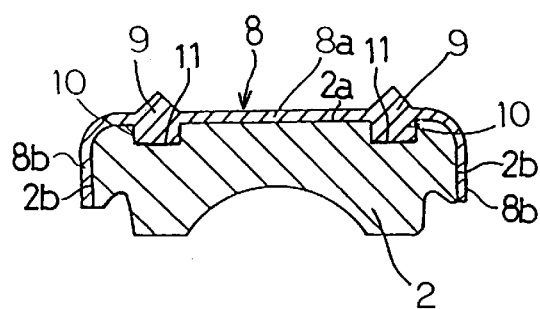
FIGS. 5 and 6 are views similar to FIG. 4, showing the rolling contact bearing according to third and fourth preferred embodiments of the present invention, respectively.
Figure 6:
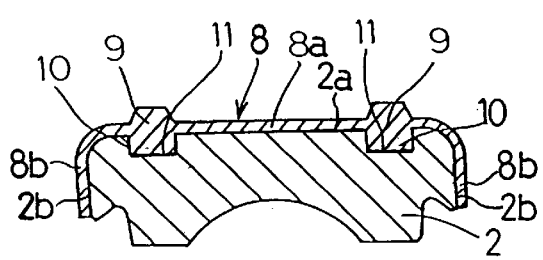

It is to be noted that as is the case with any one of the second to fourth preferred embodiments of the present invention shown respectively in FIGS. 4 to 6, the annular lateral grooves 12, which have been described as defined on the respective opposite end faces 2b of the outer race 2 in the first embodiment of the present invention, and the associated annular lateral protrusions 13 of the insulating covering 8 may not be always essential and may therefore be dispensed with.

In any event, each of the radially outer protrusions 9 of the insulating covering 8 is preferably of a cross-sectional shape wherein a portion thereof at a point intermediate of the width thereof protrudes, for example, of a generally semi-circular cross-sectional shape as shown in FIG. 1, a generally triangular cross-sectional shape as shown in FIG. 5 or a generally trapezoidal cross-sectional shape as shown in FIG. 6.

Figure 7:
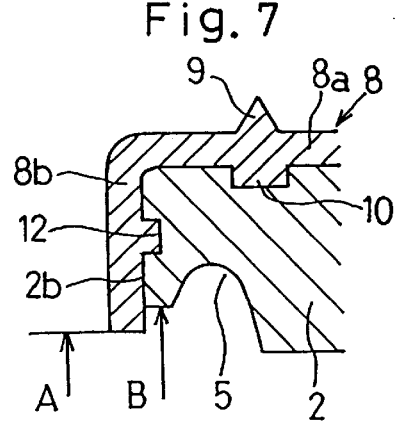
FIGS. 7 and 8 are fragmentary sectional views, on an enlarged scale, of one end portion of an outer race of the rolling contact bearing according to fifth and sixth preferred embodiments of the present invention, respectively.

Also, as shown in FIG. 7 showing the fifth embodiment of the present invention, each collar 8a of the insulating covering 8 has an inner diameter A which is preferably smaller than the inner diameter B of the outer race 2 as measured between opposite points of the adjacent inner peripheral edge of the outer race 2 (that is, in the illustrated embodiment, the inner diameter of a cylindrical face occupied in the inner peripheral surface of the outer race 2 by the end face 2b of the outer race 2 and the associated seal seat 5) when and so long as the insulating covering 8 is tightly mounted on the outer race 2.

Figure 3:
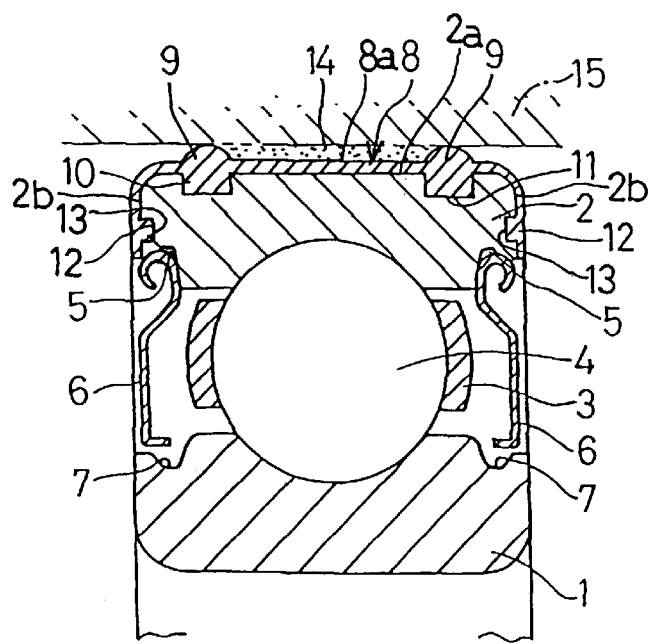
FIG. 3 is a fragmentary sectional view of the rolling contact bearing of FIG. 1 as mounted in a journal box.

When it comes to mounting of the rolling contact bearing in a journal box 15, as shown in FIG. 3, a lubricant oil 14 such as a grease is applied on a portion of the outer peripheral surface of the insulating covering 8 delimited between the radially outer protrusions 9, and the rolling contact bearing is thereafter press-fitted into the journal box 15 with the radially outer protrusions 9 sliding along an inner peripheral surface of the journal box 15. The journal box 15 referred to is made of a ferrous material.

Figure 10:
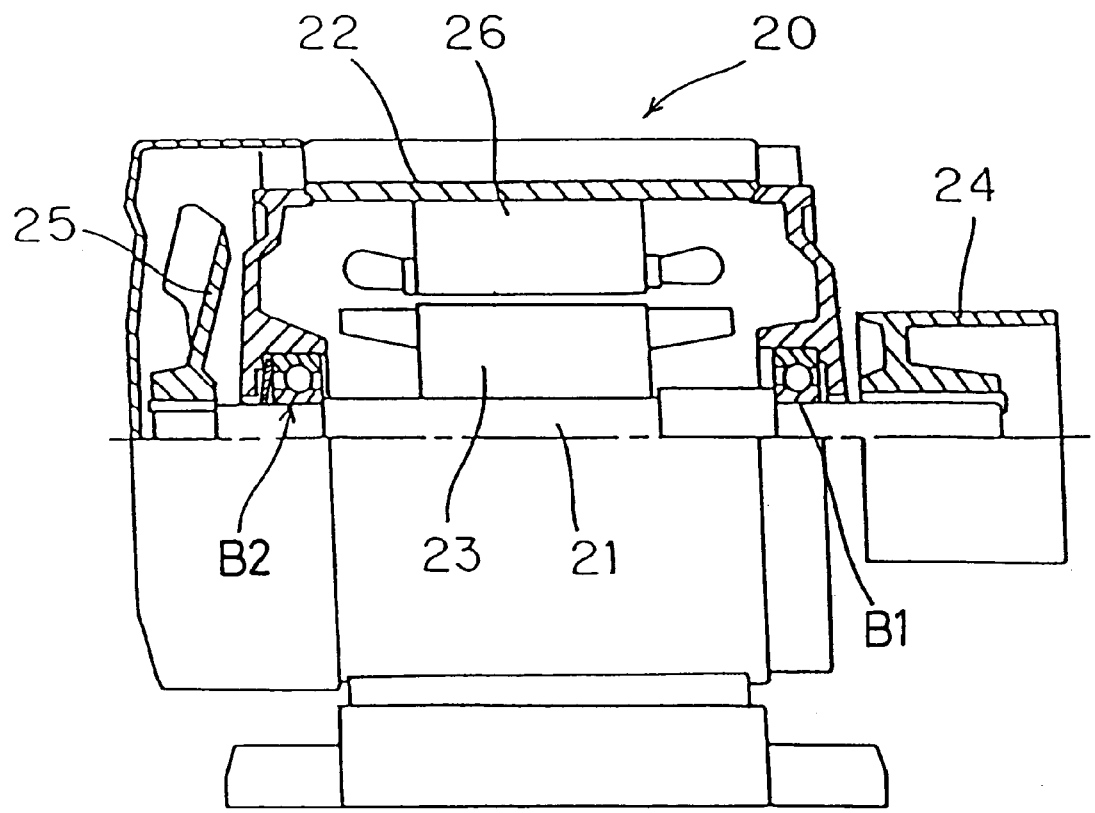
FIG. 10 is a schematic side view of an electric motor, with an upper half thereof shown in section, showing how the rolling contact bearing of the present invention is used in the motor.
Figure 11:
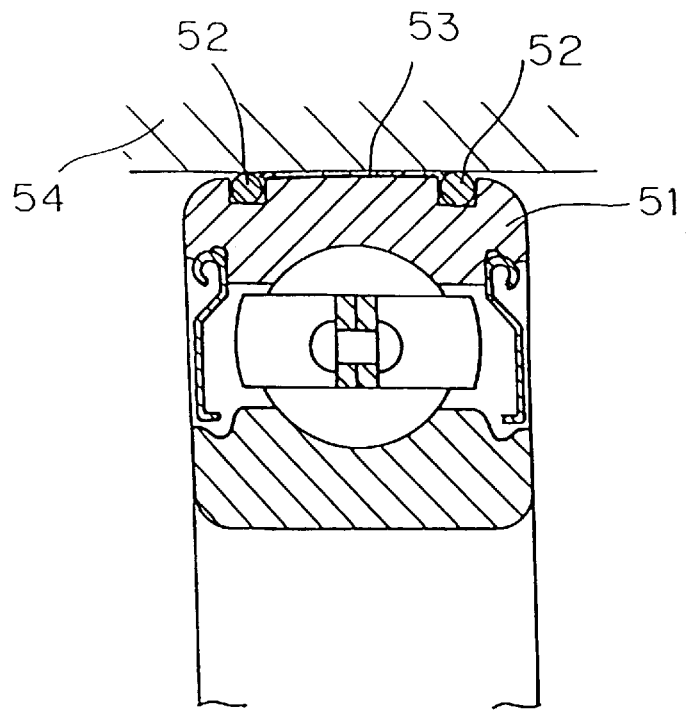
FIG. 11 is a fragmentary sectional view of the prior art rolling contact bearing.
Figure 12:
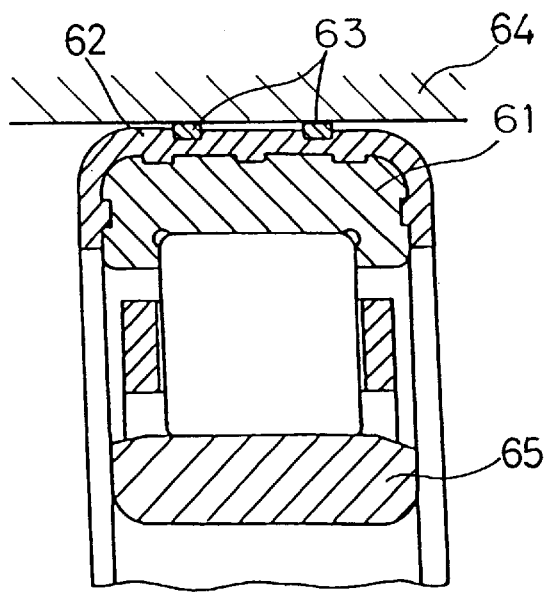
FIG. 12 is a fragmentary sectional view of the different prior art rolling contact bearing.

With the rolling contact bearing of the above described construction, since the bearing itself is essentially covered by the insulating covering 8, any possible electric corrosion between the rolling elements 4 and one of the inner and outer races 1 and 2 can be prevented which would otherwise result from a potential difference developed between the journal box 15 and the shaft (not shown) received in the bore of the inner race 1. Also, since the lubricant oil 14 applied to that portion of the insulating covering 8 is retained within a space delimited by the radially outer protrusions 9 of the insulating covering 8, that outer peripheral surface portion of the insulating covering 8, and the inner peripheral surface of the journal box 15, not only can a frictional force which would develop the creep force be advantageously reduced, but also friction between the radially outer protrusions 9 and the inner peripheral surface of the journal box 15 is effective to prevent creepage. Thus, since the sealed lubricant oil 14 enhances the anti-creep effect, resistance to an axial displacement of the outer race 2 relative to the journal box 15 is minimal and, therefore, the rolling contact bearing of the present invention can advantageously be also used as a free-side bearing (for example, a bearing B2 disposed at the rear of the drive motor as shown in FIG. 10).

The insulating covering 8 is formed as a member separate from the outer race 2 and is subsequently mounted on the outer race 2, as hereinbefore described. Therefore, any existing production line for manufacturing the standard bearing can be employed to produce the rolling contact bearing having no insulating covering 8. The insulating covering 8 can then be mounted externally onto the rolling contact bearing so manufactured, so as to cover the outer race 2 in the manner described above. Accordingly, without the existing production line being greatly altered, and with minimum requirements to add the existing production line, the electrically insulated rolling contact bearing can be manufactured easily and inexpensively. In addition, since the insulating covering 8 is made of the elastic material such that when tightly mounting on the outer race 2 of the bearing, the insulating covering 8 can be expanded against its own elasticity, the insulating covering 8 once tightly mounted on the outer race 2 will not accidentally separate therefrom during transportation or storage of the bearing, or during mounting of the bearing in the journal box 15 and can therefore be mounted snugly in the journal box 15.

Although formed as a member separate from the outer race 2 of the rolling contact bearing as hereinbefore described, the insulating covering 8 is mounted on the outer race 2 by the time the rolling contact bearing is shipped from a production factory. Accordingly, when the bearing is to be installed in the machine, all that are required is application of the lubricant oil and, therefore, not only can the number of steps to complete the assembly be reduced, but there is no possibility that the worker may fail to mount a component part such as the O-ring as is the case with the prior art anti-creep bearing and/or any possible separation of the O-ring during handling such as occurring with the prior art anti-creep bearing. As discussed above, the present invention is effective to provide the rolling contact bearing having an anti-creep capability and also an electric insulation, which is inexpensive and easy to handle.

Also, if as is the case with the fifth embodiment of the present invention shown in FIG. 7, the inner diameter A of each collar 8b of the insulating covering 8 is chosen to be smaller than the inner diameter B of the outer race 2 as measured between opposite points of the adjacent inner peripheral edge of the outer race 2 when and so long as the insulating covering 8 is tightly mounted on the outer race 2, any possible generation of electric sparks between the inner peripheral surface of the outer race 2 and the journal box 15 can advantageously be avoided.

Figure 8:
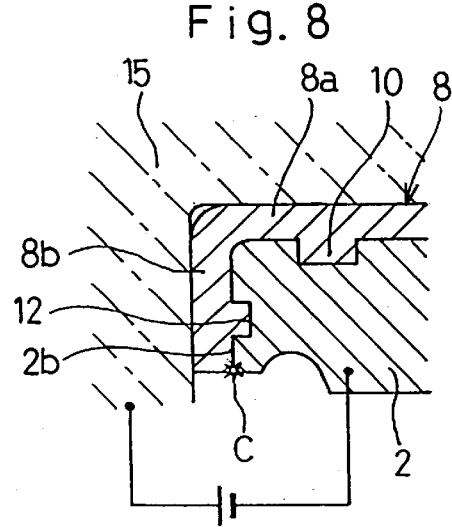

It is to be noted that as is the case with the sixth embodiment of the present invention shown in FIG. 8, the inner diameter of each collar 8b of the insulating covering 8 may be equal to the inner diameter of the outer race 2 as measured between the opposite points of the adjacent inner peripheral edge thereof. In such case, however, if the journal box 15 is of, for example, a design having a portion thereof confronting the adjacent end face 2b of the outer race 2 through the associated collar 8a of the insulating covering 8 and where a voltage applied between the journal box 15 and the outer race 2 is relatively high, there is the possibility that electric sparks may occur between the journal box 15 and an inner edge portion C of the inner surface of the outer race 2, which forms a portion of an outwardly exposed surface of the outer race 2 closest to the journal box 15. Accordingly, selection of the inner diameter A of each collar 8a of the insulating covering 8 to be smaller than the inner diameter B of the outer race 2 as measured between opposite points of the adjacent inner peripheral edge of the outer race 2 is effective to increase a spatial distance or a creeping distance between the outer race 2 and the journal box 15 to thereby eliminate the possibility of generation of the electric sparks.

Also, the radial inner protrusions 10 of the insulating covering 8 that are engaged in the corresponding annular grooves 11 formed in the outer race 2 facilitate positioning of the insulating covering 8 relative to the outer race 2 when the insulating covering 8 is to be mounted on the outer race 2 and, therefore, not only can the mounting of the insulating covering 8 on the outer race 2 be facilitated, but also the possibility of the insulating covering 8 once mounted on the outer race 2 will hardly separate from the outer race 2. Also, since each radial outer protrusion 9 integral with the insulating covering 8 is aligned with the corresponding radial inner protrusion 10 in a radial direction so as to provide an increased thickness of the elastic material forming the insulating covering 8, the respective radial outer protrusion 9 can deform considerably during insertion of the outer race 2 and, hence, facilitates installation of the bearing 1 inside the journal box 15.

FIG. 10 illustrates the electric motor 20 employing the rolling contact bearing of the structure described hereinbefore. In this motor 20, a motor shaft 21 is rotatably supported by front and rear bearings B1 and B2. Of them, the front bearing B1 is used as a fixed-side bearing that is fixed to a motor casing 22 serving as a journal box and the rear bearing B2 is used as a free-side bearing that permits an axial displacement of the motor shaft 21 relative to the motor casing 22 when thermal expansion takes place. The rolling contact bearing of the structure shown in FIG. 1 is used as the free-side bearing B2. The motor shaft 21 shown in FIG. 10 has an armature 23 fixedly mounted thereon and positioned inside the motor casing 22, a power transmitting element 24 such as, for example, a pulley fixedly mounted on a front end thereof, and a blower fan 25 fixedly mounted on a rear end thereof for cooling the motor 20. The motor casing 22 has a field magnet 26 secured thereto and encircling the armature 23.

Also, where each of the radial outer protrusions 9 of the insulating covering 8 is so shaped as to have a cross-sectional shape wherein a portion thereof at a point intermediate of the width thereof protrudes outwardly such as shown in any one of FIGS. 1 to 7, a portion of each radial outer protrusion 9 that defines a fastening margin will be deformed to allow it to tilt in either lateral direction and, therefore, not only can mounting of the bearing in the journal box 15 be facilitated, but also the resistance to an axial movement of the outer race 2 can be minimized. Accordingly, the rolling contact bearing of the present invention can further advantageously be used as the free-side bearing B2 as shown in FIG. 10.

Figure 9:
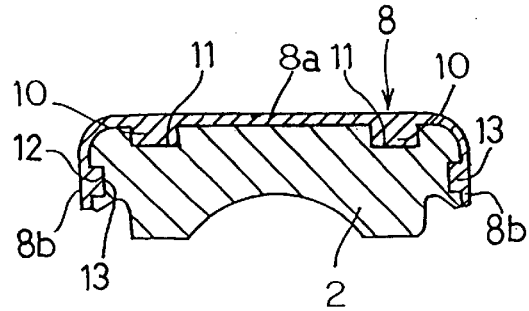
FIG. 9 is a view similar to FIG. 4, showing the rolling contact bearing according to a seventh preferred embodiment of the present invention.

Although in any one of the foregoing embodiments of the present invention the lubricant oil 14 is applied and retained as shown in FIG. 3 at the time of mounting of the bearing in the journal box 15, where no function of avoiding the creepage is required, the lubricant oil 14 need not be employed and the insulating covering 8 may be press-fitted into the journal box 15 so as to tightly contact the inner peripheral surface of the journal box 15. Even in this case, a similar electric insulating effect to that described above can be obtained.

Where the bearing is mounted in the journal box 15 with no lubricant oil 14 employed, the insulating covering 8 may have a smooth outer peripheral surface as is the case with the seventh embodiment of the present invention shown in FIG. 9 with no radial protrusions 9 employed. In such case, when the bearing 1 is to be mounted in the journal box 15, resistance to insertion of the bearing 1 into the journal box 15, which would be brought about by the presence of the radial outer protrusions 9, would not occur and, therefore, the bearing can easily and smoothly be mounted in the journal box 15.

Moreover, although in any one of the foregoing embodiments of the present invention, the insulating covering 8 has been described as a member separate from the outer race 2, the insulating covering 8 may be integrally formed with the outer race 2 by the use of any known insert-molding technique. In such case, the production line may be required to be complicated as compared with that used to manufacture the bearing according to any one of the foregoing embodiments of the present invention, but the insulating covering 8 can assuredly be mounted on the outer race 2.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rolling contact bearing which comprises:

an inner race;

an outer race accommodating therein the inner race;

a plurality of rolling elements interposed between the inner and outer races; and an insulating covering made of an elastic material having an electric insulating property, said insulating covering including a generally cylindrical body and collars extending radially inwardly from opposite ends of the cylindrical body, said insulating covering being mounted on the outer race;

wherein said cylindrical body in a natural condition has an inner diameter smaller than an outer diameter of the outer race, and when the insulating covering is mounted on the outer race against its own elasticity, the cylindrical body is held in tight contact with an outer peripheral surface of the outer race and the collars are held in tight contact with respective opposite end faces of the outer race.

2. The rolling contact bearing as claimed in claim 1, wherein the outer race has its outer peripheral surface formed with annular grooves and wherein the insulating covering is formed with annular inner protrusions engaged respectively in the annular grooves in the outer peripheral surface of the outer race.

3. The rolling contact bearing as claimed in claim 1, wherein the outer race has opposite end faces formed with respective annular grooves and wherein the insulating covering is formed with annular lateral protrusions engaged respectively in the annular grooves in said end faces of the outer race.

4. The rolling contact bearing as claimed in claim 1, wherein each of the collars of the insulating covering has an inner diameter smaller than an inner diameter of an inner edge portion of the outer race adjacent the corresponding end face when and so long as the insulating covering is mounted on the outer race.

5. The rolling contact bearing as claimed in claim 1, wherein the cylindrical body of the insulating covering is formed at a plurality of location with a radial outer protrusion protruding radially outwardly therefrom, and an oil is applied in a space defined between the neighboring radial outer protrusions.

6. The rolling contact bearing as claimed in claim 5, wherein the cylindrical body of the insulating covering is formed with a radial inner protrusion protruding radially inwardly therefrom at a location aligned with each of the radial outer protrusions, said radial inner protrusions being engaged in the annular grooves in the outer peripheral surface of the outer race.

7. The rolling contact bearing as claimed in claim 5, wherein each of the radial outer protrusions is of a cross-sectional shape wherein a portion thereof at a point intermediate of the width thereof protrudes outwardly.

8. The rolling contact bearing as claimed in claim 7, wherein said shape is of a generally semi-circular shape, a generally trapezoidal shape or a generally triangular shape.

9. A mounting for installing the rolling contact bearing according to claim 5 in a journal box, wherein an oil is applied in the space between the neighboring radial outer protrusions of the insulating covering and the outer race is press-fitted into an inner peripheral surface of the journal box.

* * * * *

UNITED STATES PATENT AND TRADEMARK OFFICE
CERTIFICATE OF CORRECTION

PATENT NO. : 5,975,764
DATED : November 2, 1999
INVENTOR(S) : Kenji Okada et al.

It is certified that error appears in the above-identified patent and that said Letters Patent is hereby corrected as shown below:

<u>Title page,</u>
Item [73], please correct the name of the Assignee from "NT Corporation" to -- NTN Corporation --.

Signed and Sealed this

Twenty-second Day of October, 2002

Attest:

Attesting Officer

JAMES E. ROGAN
*Director of the United States Patent and Trademark Office*